US011858782B2

(12) United States Patent
Kaiturinmäki et al.

(10) Patent No.: US 11,858,782 B2
(45) Date of Patent: Jan. 2, 2024

(54) TROLLEY OF ROPE CRANE

(71) Applicant: Konecranes Global Corporation, Hyvinkaa (FI)

(72) Inventors: Jari Kaiturinmäki, Hyvinkaa (FI); Simo Säkkinen, Hyvinkaa (FI)

(73) Assignee: Konecranes Global Corporation, Hyvinkaa (FI)

(*) Notice: Subject to any disclaimer, the term of this patent is extended or adjusted under 35 U.S.C. 154(b) by 430 days.

(21) Appl. No.: 17/309,759

(22) PCT Filed: Dec. 16, 2019

(86) PCT No.: PCT/FI2019/050892
§ 371 (c)(1),
(2) Date: Jun. 17, 2021

(87) PCT Pub. No.: WO2020/128155
PCT Pub. Date: Jun. 25, 2020

(65) Prior Publication Data

US 2022/0112054 A1 Apr. 14, 2022

(30) Foreign Application Priority Data

Dec. 19, 2018 (FI) ..................................... 20186108

(51) Int. Cl.
*B66C 11/00* (2006.01)
*B66D 1/14* (2006.01)
*B66D 1/28* (2006.01)

(52) U.S. Cl.
CPC ................ *B66C 11/00* (2013.01); *B66D 1/14* (2013.01); *B66D 1/28* (2013.01)

(58) Field of Classification Search
CPC ........... B66C 11/00; B66C 11/06; B66D 1/14; B66D 1/28; B66D 2700/0183;
(Continued)

(56) References Cited

U.S. PATENT DOCUMENTS 2,514,494 A * 7/1950 Holdeman ................ B66C 7/00 212/331
3,550,787 A * 12/1970 Hicks ....................... B66D 3/22 212/331

(Continued)

FOREIGN PATENT DOCUMENTS

BE 664573 A 9/1965
CA 2 652 567 A1 5/2008

(Continued)

OTHER PUBLICATIONS

Chinese Office Action and Search Report for Chinese Application No. 201980084315.X, dated May 17, 2022, with English translation.

*Primary Examiner* — Michael R Mansen
*Assistant Examiner* — Juan J Campos, Jr.
(74) *Attorney, Agent, or Firm* — Birch, Stewart, Kolasch & Birch, LLP

(57) ABSTRACT

A trolley of a rope crane, comprising a trolley body, a transverse load beam of the trolley, a hoisting mechanism and comprises a rope drum, a hoisting motor for driving the rope drum, and a gear for coupling the hoisting motor to the rope drum, whereby the gear has a primary side and a secondary side, and whereby the rope drum is located, in the vertical direction of the trolley, between the hoisting motor and load beam parallel to the load beam. The hoisting mechanism is supported by a three-point support to a main beam, whereby the first support point and second support point are adjacent to the secondary side of a gear, and whereby the third support point is formed by a support of the rope from end facing away from the gear to the load beam at a lateral distance from the first and second support point.

4 Claims, 1 Drawing Sheet

Figures 1, 2, 3A, 3B:
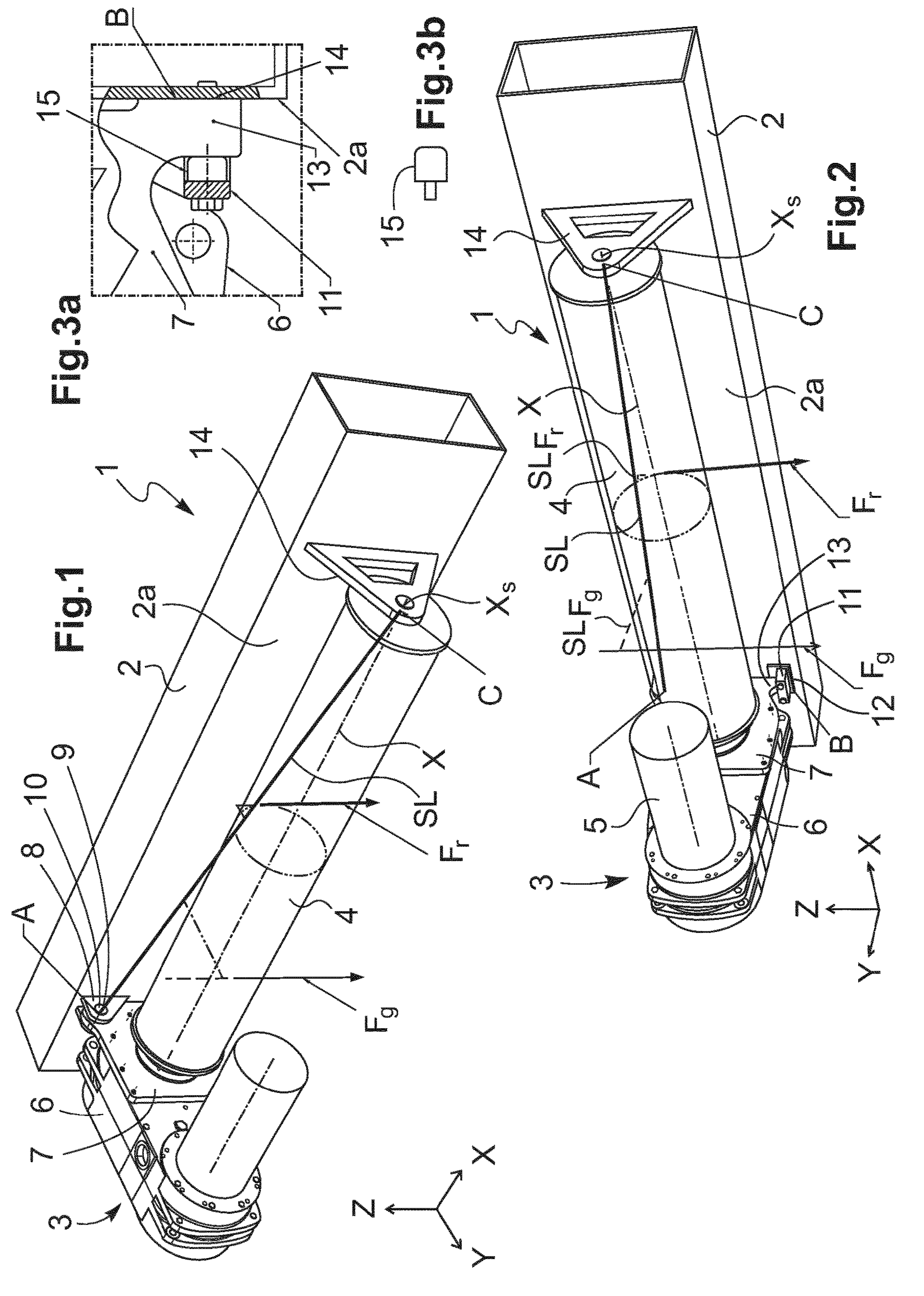

(58) Field of Classification Search
CPC .... B66D 2700/0125; B66D 2700/0133; B66D 2700/0141
See application file for complete search history.

(56) References Cited

U.S. PATENT DOCUMENTS

| | | | | |
|---|---|---|---|---|
| 4,123,040 | A * | 10/1978 | Kuzarov | B66D 1/28 254/389 |
| 5,378,082 | A * | 1/1995 | Hiller | B63C 3/06 405/1 |
| 6,564,954 | B1 | 5/2003 | Buhlmayer et al. | |
| 10,526,175 | B2 * | 1/2020 | Lindberg | B66D 1/14 |
| 10,961,085 | B2 * | 3/2021 | Lindberg | B66D 1/36 |
| 2012/0256145 | A1 * | 10/2012 | Zhao | B66D 1/36 254/266 |
| 2017/0022032 | A1 | 1/2017 | Lindberg et al. | |
| 2017/0029251 | A1 | 2/2017 | Lindberg et al. | |
| 2018/0346295 | A1 | 12/2018 | Kosuga et al. | |
| 2021/0206604 | A1 | 7/2021 | Karlsson et al. | |

FOREIGN PATENT DOCUMENTS

| | | | |
|---|---|---|---|
| CN | 1462719 | A | 12/2003 |
| CN | 201801308 | U | 4/2011 |
| CN | 202226566 | U | 5/2012 |
| CN | 202785323 | U | 3/2013 |
| CN | 105939955 | A | 9/2016 |
| CN | 106061884 | A | 10/2016 |
| CN | 107614419 | A | 1/2018 |
| CN | 107882357 | A | 4/2018 |
| CN | 108602651 | A | 9/2018 |
| DE | 536115 | C | 11/1931 |
| DE | 1269317 | B | 5/1968 |
| EP | 1553042 | A1 | 7/2005 |
| FR | 2537964 | A1 | 6/1984 |
| GB | 1087354 | A | 10/1967 |
| JP | 2010-235271 | A | 10/2010 |
| WO | WO 2016/178339 | A1 | 11/2016 |

* cited by examiner

TROLLEY OF ROPE CRANE

BACKGROUND OF THE INVENTION

The invention relates to a trolley of a rope crane, comprising a body of the trolley, a transverse load beam of the trolley, forming part of the trolley body, a hoisting mechanism which is supported to the trolley body and comprises a rope drum for at least one hoisting rope, a hoisting motor for driving the rope drum, and a gear for coupling the hoisting motor to the rope drum, whereby the gear has a primary side coupled to the hoisting motor, and a secondary side coupled to the rope drum, and whereby the rope drum is located, as seen in the vertical direction of the trolley, between the hoisting motor and load beam parallel to the load beam.

In a trolley of the type described in the above, the hoisting mechanism has conventionally been supported to the trolley body by a three-point support in which one support point is between the hoisting gear and the rope drum, that is, on the secondary side of the hoisting mechanism, the second support point on the primary side of the trolley and hoisting gear (where the output shaft of hoisting motor is located), while the third support point is between the load beam and the "free end" of the rope drum i.e. the end of the rope drum, which is facing away from the gear. The moment resulting from the use of the hoisting mechanism is received by the second support point on the primary side of the hoisting mechanism, whereby the support force decreases as the supporting distance increases. The arrangement of the moment support like this is one of the determining factors for the width of the trolley (body of the trolley) or for the rail gauge of the trolley, which may turn out to be too large for certain uses of the trolley. The distance of the primary side support point from the load beam brings forth a situation where it is natural to locate the support point on end girders at the ends of the load beam, and therefore the location of the support point also determines the rail gauge of the trolley. An alternative way is to make a protrusion on the flank of the load beam, which makes the structure of the load beam complicated, bulky, and heavy.

SUMMARY OF THE INVENTION

It is an object of the invention to improve the support of the hoisting mechanism so that the aforementioned problems may be solved. This object is reached by a trolley according to the invention, which is characterized in that a hoisting mechanism is supported by a three-point support to a main beam, whereby the first support point and second support point are located adjacent to the secondary side of a gear so that the first support point is higher on the main beam and the second support point is lower on the main beam at a distance from the first support point, and whereby the third support point is formed by a support of the rope drum end which is facing away from the gear to the load beam at a lateral distance from the first and second support point.

The first support point receives forces in the radial direction of the support point, which are caused by the masses, resultant of the rope force, and support force of the moment caused by the resultant of the rope force. The mass of the hoisting gear, hoisting motor, and rope drum in turn brings forth compression to the second support point. In addition, the second support point acts as a second support point for the moment caused by the resultant of the rope force.

With the inventive moment support arrangement in which also the second support point i.e. moment support is arranged on the secondary side of the hoisting mechanism, but at an adequate distance from the first support point to the load beam, the required moment support is achieved at the same time as this arrangement makes it possible to separate the width of the trolley or its rail gauge from the support of the hoisting mechanism. This means that the aforementioned restrictions are eliminated, caused by arranging the moment support on the end girders.

A preferred application for the solution according to the invention is a trolley in which an active rope guiding device is used in multi-layer winding and guiding of a rope, whereby one or more hoisting ropes are wound on an effectively short rope drum through a plurality of sheaves. However, usage is not limited exclusively to such a trolley, but the invention may be applied to all trolleys for which it is desired that the width or rail gauge of the trolley is independent of arranging the moment support needed by the hoisting mechanism. Consequently, the solution according to the invention allows, in particular, an increase in the width or rail gauge of the trolley.

The solution according to the invention additionally facilitates the installation of the hoisting mechanism and does not add to internal forces within the gear.

Preferred embodiments of the invention are disclosed in the dependent claims.

LIST OF FIGURES

The invention is now described in closer detail in connection with a preferred embodiment and with reference to the accompanying drawings, in which FIG. 1 shows part of a trolley as a perspective view obliquely from above;

FIG. 2 shows the trolley seen in FIG. 1 as a perspective view obliquely from below; and FIGS. 3*a* and 3*b* show arranging a pretension of the second support point.

DETAILED DESCRIPTION OF THE INVENTION

With reference the to figures in the drawings, they show an essential part of the trolley 1, associated with the present invention. It comprises a trolley to body, of which a load beam 2, only, in the transverse direction of the trolley 1 is shown. Other body parts related to the load beam 2 and not shown do not bear an essential meaning from the viewpoint of the invention.

The trolley 1 shown in the drawings further comprises a hoisting mechanism 3 which is supported to the trolley body 2 and comprises a rope drum 4 for at least one hoisting rope (not shown), a hoisting motor 5 for driving the rope drum, and a gear 6 for coupling the hoisting motor 5 to the rope drum 4.

The gear 6 has a primary side coupled to the hoisting motor 5 and a secondary side coupled to the rope drum 4, whereby the rope drum 4 is located, as seen in the vertical direction of the trolley 1, between the hoisting motor 5 and the load beam 2 parallel to the load beam 2.

The essential matter in the present invention is that the hoisting mechanism 3 is supported by a three-point support A, B, C to the main beam 2, whereby the first support point A and second support point B are located adjacent to the secondary side of a gear 6 so that the first support point A is higher on the main beam 2 and the second support point B is lower on the main beam 2 at a distance from the first support point A, and whereby the third support point C is formed by a support of the rope drum 4 end facing away from the gear 6 to the load beam 2 at a lateral distance from the first and second support point A, B.

At the first support point A, the movement of an installation flange 7 of the gear 6 in the vertical, longitudinal, and transverse directions is prevented, but rotation is allowed, i.e. in the XYZ coordinate system, shown in the drawings, movements in the X, Y, and Z directions are prevented whereas rotation in these direction is free. At the second support point B, the movement of the gear 6 in the direction towards the load beam 2 is prevented, but movement in the longitudinal and vertical direction of the load beam 2 as well as rotation allowed, i.e. movement in said coordinate systems in the Y direction is prevented, but allowed in X and Z directions, rotation in all the directions being free. The support point B forms a moment support of the gear, whereby depending on this support, the distance of the resultant of the rope force causes compression or traction towards the load beam 2. At the third support point C, the movement of the rope drum 4 end facing away from the gear 6 in the vertical direction and towards the load beam 2 is prevented, but movement in the longitudinal direction of the load beam 2 and rotation are allowed, i.e. movements in the Y and Z directions, only, are prevented, but free in the X direction are free, rotation in all the directions being free. The gravitational force $F_g$ and on the line SL between the support points the resultant of the support moments $Mm=F_g \times SLF_g$ and $M_f=F_r \times SLF_r$ caused by gravity and rope force defines the magnitude and direction (compression or tractive force) of the force directed to the support point B.

The hoisting mechanism 3 advantageously comprises a vertical installation flange 7 fastened to the flank of the gear 6, whereby the first support point A comprises a first lug 8 on the vertical side 2*a* of the load beam 2, in its top part, to which lug the top part of the installation flange 7 is supported by means of a pin and ball joint 10 in the longitudinal direction of the load beam 2, which are installed through openings 9 in the top part of the installation flange 7 and the first lug 8. The second support point B comprises a second lug 11 on the vertical side 2*a* of the load beam 2, in its bottom part, which has a vertical opening 12 to which a support protrusion 13 formed in the bottom part of the installation flange 7 extends. Obviously, the aforementioned installation flange 7 may also be part of the casing of the gear 6. The third support point C comprises a third lug 14 on the vertical side 2*a* of the load beam 2, at the rope drum 4 end facing away from the gear 7, to which the end Xs of the shaft X of the rope drum 4 is supported.

With reference to FIG. 3*a*, there is arranged in the second lug 11 a horizontal pretension, towards the vertical side 2*a* of the load beam 2, With this, traction is converted into compression at the support point B. In addition, between the vertical side 2*a* of the load beam 2 and the second lug 11 there is arranged a slide surface 14 which may be arranged between the second lug 11 and the vertical side 2*a* of the load beam 2. In the pretension, a flexible element 15 between a tensioning surface of the lug 11 and the support protrusion 13, the flexible element in FIG. 3*a* being shown in a compressed state. An uncompressed state of the flexible element 15 is shown in FIG. 3*b*.

Alternatively, the aforementioned installation flange 7 may be part of the casing of the gear 6.

The above description of the invention is only intended to illustrate the basic idea of the invention. A person skilled in the art may thus vary the details of the invention within the scope of the attached claims.

The invention claimed is:

1. A trolley of a rope crane, comprising:

a trolley body, a transverse load beam of the trolley, forming part of the trolley body, a hoisting mechanism which is supported to the trolley body and comprises a rope drum for at least one hoisting rope, a hoisting motor for driving the rope drum, and a gear for coupling the hoisting motor to the rope drum, whereby the gear has a primary side coupled to the hoisting motor, and a secondary side coupled to the rope drum, and whereby the rope drum is located, as seen in the vertical direction of the trolley, between the hoisting motor and load beam parallel to the load beam, whereby the hoisting mechanism is supported by a three-point support to a main beam, whereby the first support point and second support point are located adjacent to the secondary side of the gear so that the first support point is higher on the main beam and the second support point is lower on the main beam at a distance from the first support point, and whereby the third support point is formed by a support of the rope drum end facing away from the gear to the load beam at a lateral distance from the first and second support point, wherein at the first support point, the movement of the gear in the vertical, longitudinal, and transverse directions is prevented, but rotation is allowed, at the second support point, the movement of the gear in the direction towards the load beam is prevented, but movement in the longitudinal and vertical direction of the load beam as well as rotation are allowed, and at the third support point, the movement of the rope drum end facing away from the gear in the vertical direction and towards the load beam is prevented, but movement in the longitudinal direction of the load beam and rotation are allowed.

2. A trolley as claimed in claim 1, wherein the hoisting mechanism comprises a vertical installation flange fastened to the flank of the gear, or forming part of the casing of the gear, whereby the first support point comprises a first lug on the vertical side of the load beam, in its top part, to which lug the top part of the installation flange is supported by means of a pin and ball joint in the longitudinal direction of the load beam, which are installed through openings at the top part of the installation flange and the first lug; the second support point comprises a second lug on the vertical side of the load beam, in its bottom part, which has a vertical opening to which a support protrusion formed in the bottom part of the installation flange extends; and the third support point comprises a third lug on the vertical side of the load beam, at the rope drum end facing away from the gear, to which the end of the shaft of the rope drum is supported.

3. A trolley as claimed in claim 2, wherein in the second lug a horizontal pretension is arranged towards the vertical side of the load beam.

4. A trolley as claimed in claim 2, wherein between the vertical side of the load beam and the second lug there is arranged a slide surface.

* * * * *